(12) United States Patent
Cao et al.

(10) Patent No.: US 11,984,995 B2
(45) Date of Patent: May 14, 2024

(54) MIXED MODE BROADCAST/MULTICAST COMMUNICATION

(71) Applicant: QUALCOMM Incorporated, San Diego, CA (US)

(72) Inventors: Yiqing Cao, Beijing (CN); Yan Li, Beijing (CN); Bin Han, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/758,238

(22) PCT Filed: Jan. 10, 2020

(86) PCT No.: PCT/CN2020/071279
§ 371 (c)(1),
(2) Date: Jun. 30, 2022

(87) PCT Pub. No.: WO2021/138880
PCT Pub. Date: Jul. 15, 2021

(65) Prior Publication Data
US 2023/0022087 A1    Jan. 26, 2023

(51) Int. Cl.
*H04L 1/1867* (2023.01)
*H04L 1/00* (2006.01)
*H04L 5/00* (2006.01)

(52) U.S. Cl.
CPC .......... *H04L 1/1887* (2013.01); *H04L 5/0055* (2013.01); *H04L 2001/0093* (2013.01)

(58) Field of Classification Search
None
See application file for complete search history.

(56) References Cited

U.S. PATENT DOCUMENTS

| 11,134,469 B2 | 9/2021 | Abraham et al. |
| 11,758,612 B2 * | 9/2023 | Huang .................... H04W 4/06 370/312 |

(Continued)

FOREIGN PATENT DOCUMENTS

| CN | 101529783 A | 9/2009 |
| CN | 102144414 A | 8/2011 |

(Continued)

OTHER PUBLICATIONS

M. Fallgren et al., "Multicast and Broadcast Enablers for High-Performing Cellular V2X Systems," in IEEE Transactions on Broadcasting, vol. 65, No. 2, pp. 454-463, Jun. 2019, doi: 10.1109/TBC.2019.2912619. (Year: 2019).*

(Continued)

*Primary Examiner* — Daniel F. McMahon
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may determine that a negative acknowledgment (NACK) feedback message for a broadcast/multicast communication is to be transmitted. The UE may transmit the NACK feedback message, via a radio access network (RAN), to a broadcast/multicast control plane function device of a core network based at least in part on determining that the NACK feedback message is to be transmitted. The UE may receive a retransmission of the broadcast/multicast communication based at least in part on transmitting the NACK feedback message.

30 Claims, 8 Drawing Sheets

(56) References Cited

U.S. PATENT DOCUMENTS

| | | | |
|---|---|---|---|
| 2008/0256409 | A1 | 10/2008 | Oran et al. |
| 2011/0219281 | A1 | 9/2011 | Wang et al. |
| 2013/0315124 | A1* | 11/2013 | Rapaport .............. H04W 72/23 370/312 |
| 2016/0119762 | A1 | 4/2016 | Zhu et al. |
| 2021/0028890 | A1* | 1/2021 | Rico Alvarino ...... H04L 1/1812 |
| 2021/0297199 | A1* | 9/2021 | Miao ..................... H04L 5/0048 |
| 2021/0400635 | A1* | 12/2021 | Blasco Serrano .... H04L 1/1858 |
| 2023/0019024 | A1* | 1/2023 | Stare ..................... H04W 72/30 |
| 2023/0071767 | A1 | 3/2023 | Zhou et al. |

FOREIGN PATENT DOCUMENTS

| | | |
|---|---|---|
| CN | 102594529 A | 7/2012 |
| CN | 103988559 A | 8/2014 |
| CN | 104579602 A | 4/2015 |
| WO | WO-2017035727 A1 | 3/2017 |
| WO | WO-2018056108 A1 | 3/2018 |
| WO | WO-2020041332 | 2/2020 |
| WO | 2021133238 A1 | 7/2021 |

OTHER PUBLICATIONS

International Search Report and Written Opinion—PCT/CN2020/071279—ISA/EPO—dated Sep. 27, 2020.

LG Electronics: "Discussion on UE Feedback for DL Multicast/Broadcast", 3GPP Draft, 3GPP TSG RAN WG1 Meeting #85, R1-164537 Feedback for DL Broadcast, 3rd Generation Partnership Project (3GPP), Mobile Competence Centre, 650, Route Des Lucioles, F-06921, Sophia-Antipolis Cedex, France, vol. Ran WG1, No. Nanjing, China, May 23, 2016-May 27, 2016, May 14, 2016 (May 14, 2016), XP051096398, pp. 1-5, Retrieved from the Internet: URL: http://www.3gpp.org/ftp/tsg_ran/WG1_RL1/TSGR1_85/Docs/ [retrieved on May 14, 2016] pp. 1-2, section 2.

Zte et al., "Discussion on PHY Procedures for Sidelink", 3GPP TSG RAN WG1 #97, R1-1906469, Reno, USA, May 13-17, 2019, pp. 1-6, Section 1-5.

Supplementary European Search Report—EP20912127—Search Authority—The Hague—dated Sep. 7, 2023.

* cited by examiner

MIXED MODE BROADCAST/MULTICAST COMMUNICATION

CROSS-REFERENCE TO RELATED APPLICATION

This Patent Application is a 371 national stage of PCT Application No. PCT/CN2020/071279 filed on Jan. 10, 2020, entitled "MIXED MODE BROADCAST/MULTICAST COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication, and specifically to techniques and apparatuses for mixed mode broadcast or multicast (broadcast/multicast) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In mobile broadcast or multicast (broadcast/multicast), forward error coding (FEC) may be used to achieve a level of reliability for broadcast/multicast communications. FEC is a digital signal processing technique that introduces redundant data into a transmission. Accordingly, broadcast/multicast communications that utilize FEC may be relatively larger, thereby consuming extra network resources and UE processing resources.

SUMMARY

In some aspects, a method of wireless communication, performed by a user equipment (UE), may include determining that a negative acknowledgment (NACK) feedback message for a broadcast or a multicast (broadcast/multicast) communication is to be transmitted. The method may include transmitting the NACK feedback message, via a radio access network (RAN), to a broadcast/multicast control plane function (BMCPF) device of a core network based at least in part on determining that the NACK feedback message is to be transmitted. The method may include receiving a retransmission of the broadcast/multicast communication based at least in part on transmitting the NACK feedback message.

In some aspects, a method of wireless communication, performed by a device of a core network, may include receiving, using a BMCPF, a NACK feedback message for a broadcast/multicast communication transmitted to a UE. The method may include causing a retransmission of the broadcast/multicast communication based at least in part on receiving the NACK feedback message.

In some aspects, a UE for wireless communication may include memory and one or more processors operatively coupled to the memory. The memory and the one or more processors may be configured to determine that a NACK feedback message for a broadcast/multicast communication is to be transmitted. The memory and the one or more processors may be configured to transmit the NACK feedback message, via a RAN, to a BMCPF device of a core network based at least in part on determining that the NACK feedback message is to be transmitted. The memory and the one or more processors may be configured to receive a retransmission of the broadcast/multicast communication based at least in part on transmitting the NACK feedback message.

In some aspects, a device or a core network for wireless communication may include memory and one or more processors operatively coupled to the memory. The memory and the one or more processors may be configured to receive, using a BMCPF, a NACK feedback message for a broadcast/multicast communication transmitted to a UE. The memory and the one or more processors may be configured to cause a retransmission of the broadcast/multicast communication based at least in part on receiving the NACK feedback message.

In some aspects, a non-transitory computer-readable medium may store one or more instructions for wireless communication. The one or more instructions, when executed by one or more processors of a UE, may cause the one or more processors to determine that a NACK feedback message for a broadcast/multicast communication is to be transmitted. The one or more instructions may cause the one or more processors to transmit the NACK feedback message, via a RAN, to a BMCPF device of a core network based at least in part on determining that the NACK feedback message is to be transmitted. The one or more instructions may cause the one or more processors to receive a retransmission of the broadcast/multicast communication based at least in part on transmitting the NACK feedback message.

In some aspects, a non-transitory computer-readable medium may store one or more instructions for wireless communication. The one or more instructions, when executed by one or more processors of a device of a core network, may cause the one or more processors to receive, using a BMCPF, a NACK feedback message for a broadcast/multicast communication transmitted to a UE. The one or more instructions may cause the one or more processors to cause a retransmission of the broadcast/multicast communication based at least in part on receiving the NACK feedback message.

In some aspects, an apparatus for wireless communication may include means for determining that a NACK feedback message for a broadcast/multicast communication is to be transmitted. The apparatus may include means for transmitting the NACK feedback message, via a RAN, to a BMCPF device of a core network based at least in part on determining that the NACK feedback message is to be transmitted. The apparatus may include means for receiving a retransmission of the broadcast/multicast communication based at least in part on transmitting the NACK feedback message.

In some aspects, an apparatus for wireless communication may include means for receiving, using a BMCPF, a NACK feedback message for a broadcast/multicast communication transmitted to a UE. The apparatus may include means for causing a retransmission of the broadcast/multicast communication based at least in part on receiving the NACK feedback message.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
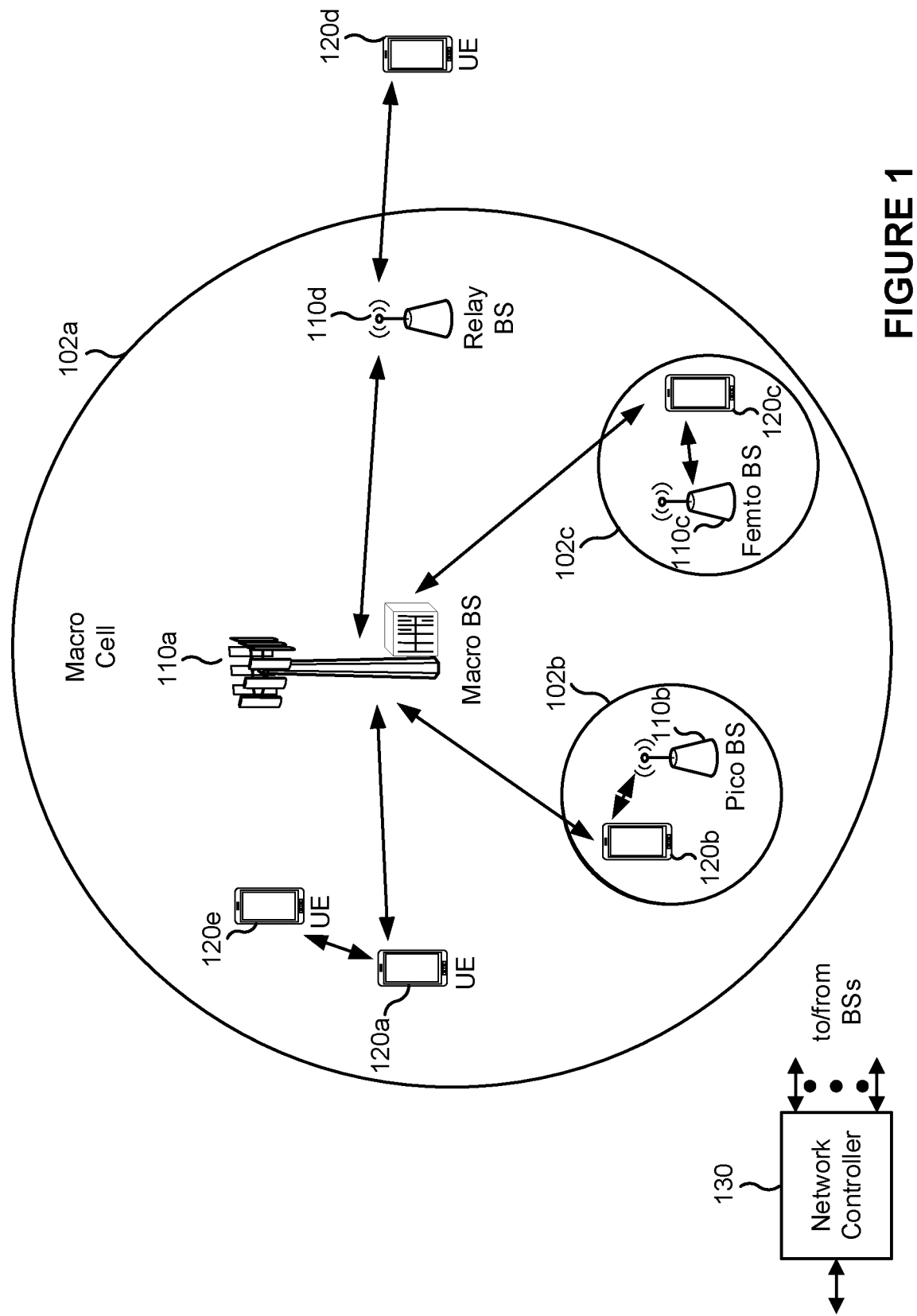
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

In mobile broadcast or multicast (broadcast/multicast), forward error coding (FEC) may be used to achieve a level of reliability for broadcast/multicast communications. FEC is a digital signal processing technique that introduces redundant data into a transmission. For example, using FEC with 10% data redundancy may provide a 1% error rate for broadcast/multicast communications. However, to achieve lower error rates, the data redundancy must be further increased. As a result, broadcast/multicast communications that are highly reliable using FEC consume significant network resources and UE processing resources. This may cause higher network congestion, lower throughput, and increased UE battery drain, among other examples.

Some techniques and apparatuses described herein improve the reliability and resource consumption of broadcast/multicast communications. In some aspects, a UE may transmit, via a radio access network (RAN), negative acknowledgment (NACK) feedback for a broadcast/multicast communication to a broadcast/multicast control plane function (BMCPF) of a core network. In response to the NACK feedback, the BMCPF may cause another function of the core network to transmit, via the RAN, a retransmission of the broadcast/multicast communication to the UE. The retransmission may be a unicast retransmission or a broadcast/multicast retransmission based at least in part on a quantity of UEs that transmitted NACK feedback for the broadcast/multicast communication. In this way, network resources and processing resources of the UE may be conserved.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In this case, the UE 120 may perform scheduling operations, resource selection operations, or other operations described elsewhere herein as being performed by the base station 110.

Figure 2:
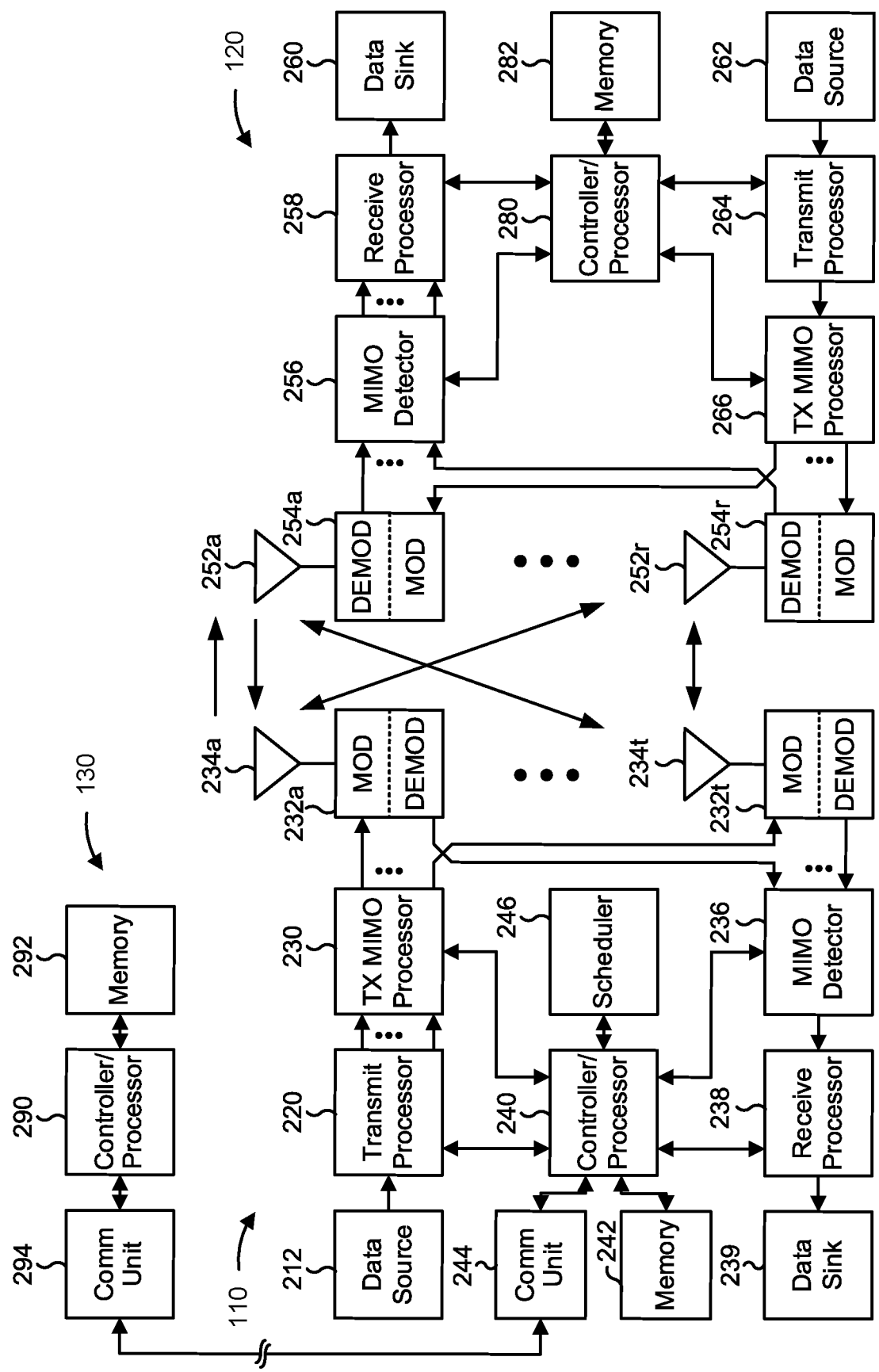
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, controller/processor 290 of network controller 130, or any other component(s) of FIG. 2 may perform one or more techniques associated with mixed mode broadcast/multicast communication, as described in more detail elsewhere herein. For example, controller/processor 240 of base station 110, controller/processor 280 of UE 120, controller/processor 290 of network controller 130, or any other component(s) of FIG. 2 may perform or direct operations of, for example, process 700 of FIG. 7, process 800 of FIG. 8, or other processes as described herein. Memories 242, 282, and 292 may store data and program codes for base station 110, UE 120, and network controller 130, respectively. A scheduler 246 may schedule UEs for data transmission on the downlink or uplink.

In some aspects, UE 120 may include means for determining that a NACK feedback message for a broadcast/multicast communication is to be transmitted, means for transmitting the NACK feedback message, via a RAN, to a BMCPF device of a core network based at least in part on determining that the NACK feedback message is to be transmitted, means for receiving a retransmission of the broadcast/multicast communication based at least in part on transmitting the NACK feedback message, among other examples, or combinations thereof. In some aspects, such means may include one or more components of UE 120 described in connection with FIG. 2.

In some aspects, a device of a core network may include means for receiving, using a BMCPF, a NACK feedback message for a broadcast/multicast communication transmitted to a UE, means for causing a retransmission of the broadcast/multicast communication based at least in part on receiving the NACK feedback message, among other examples, or combinations thereof. In some aspects, such means may include one or more components of base station 110 or network controller 130 described in connection with FIG. 2.

As described above, some techniques and apparatuses described herein improve the reliability and resource consumption of broadcast/multicast communications. In some aspects, a UE may transmit, via a RAN, NACK feedback for a broadcast/multicast communication to a BMCPF of a core network. In response to the NACK feedback, the BMCPF may cause another function of the core network to transmit, via the RAN, a retransmission of the broadcast/multicast communication to the UE. The retransmission may be a unicast retransmission or a broadcast/multicast retransmission based at least in part on a quantity of UEs that transmitted NACK feedback for the broadcast/multicast communication. In this way, network resources and processing resources of the UE may be conserved.

Figure 3:
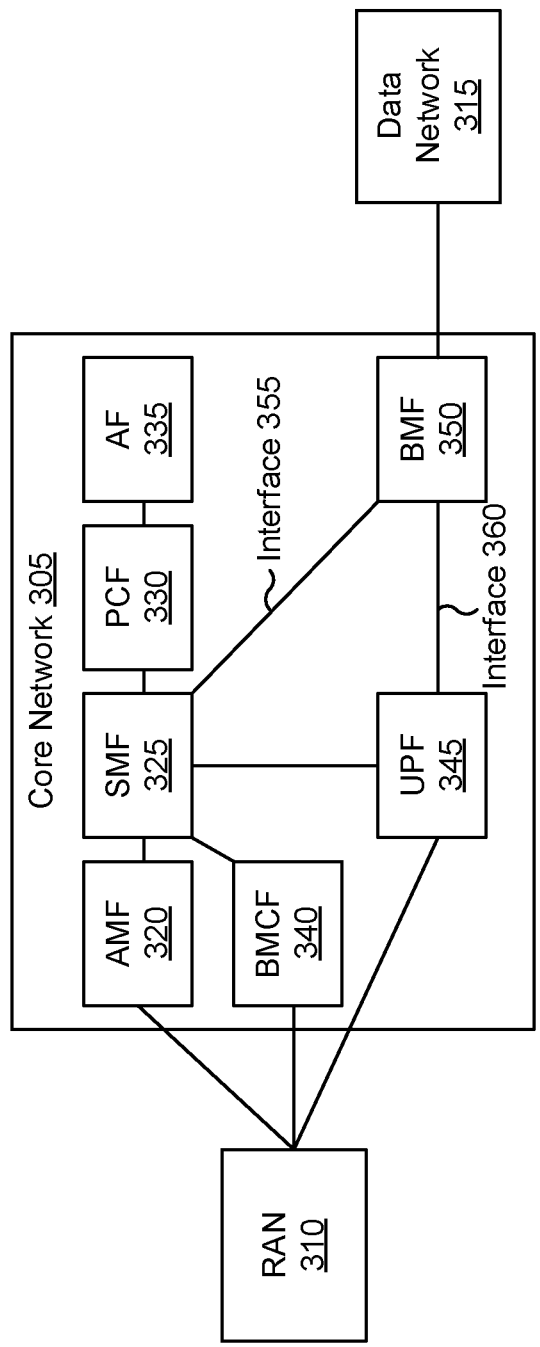
FIG. 3 is a diagram illustrating an example functional architecture of a core network in accordance with various aspects of the present disclosure.

FIG. 3 is a diagram illustrating an example functional architecture of a core network 305, in accordance with various aspects of the present disclosure. In some aspects, the core network 305 may have an architecture that merges control plane and user plane functionality. As shown in FIG. 3, the core network 305 may be in communication with a RAN 310 and a data network 315. The RAN 310 may include a base station (for example, a BS 110) and may be operatively connected, via a wired or a wireless connection, to the core network 305. The RAN 310 may facilitate communication sessions between UEs and the data network 315 by communicating application-specific data between the RAN 310 and the core network 305. The data network 315 may include one or more wired or wireless data networks. For example, the data network 315 may include the Internet, a third-party services network, an operator services network, a private network, or a wide area network, among other examples. In some aspects, the data network 315 may include a content delivery network (CDN) or one or more content servers. For example, the CDN or the one or more content servers may provide data for broadcast/multicast transmissions.

The core network 305 may include various types of core network architectures, such as a 5G next generation (NG) Core included in a 5G wireless telecommunications system. In some aspects, the core network 305 may be implemented on physical devices, such as a gateway or a mobility management entity, among other examples. In some aspects, the hardware or the software implementing the core network 305 may be virtualized. In some aspects, one or more devices implementing the core network 305 may be co-located with a base station (for example, BS 110).

As shown in FIG. 3, the core network 305 may include multiple functional elements. One or more of the functional elements of the core network 305 may be implemented on one or more devices (for example, servers). The functional elements of the core network 305 may include an access and mobility management function (AMF) 320, a session management function (SMF) 325, a policy control function (PCF) 330, an application function (AF) 335, a broadcast/multicast coordination function (BMCF) 340, a user plane function (UPF) 345, or a broadcast/multicast function (BMF) 350. As shown in FIG. 3, the RAN 310 may be connected to the core network 305 through the AMF 320, the UPF 345, or the BMCF 340.

The AF 335 may determine whether UEs provide preferences for a set of network slice policies and support application influence on traffic routing, access to a network exposure function of the core network 305, or policy control, among other examples. The AMF 320 may provide registration and mobility management of UEs. The SMF 325 may support the establishment, modification, and release of communications sessions. For example, the SMF 325 may configure traffic steering policies at the UPF 345 or enforce UE Internet protocol (IP) address allocation and policies, among other examples. The AMF 320 and the SMF 325 may act as a termination point for non-access stratum (NAS) signaling or mobility management, among other examples. The SMF 325 may act as a termination point for session management related to NAS. The PCF 330 may provide a policy framework that incorporates network slicing, roaming, packet processing, or mobility management, among other examples.

The UPF 345 may serve as an anchor point for intra/inter RAT mobility. The UPF 345 may apply rules to packets, such as rules pertaining to packet routing, traffic reporting, or handling user plane quality of service (QoS), among other examples. The UPF 345 may determine an attribute of application-specific data that is communicated in a communications session. The UPF 345 may receive information (for example, information that identifies a communications attribute of an application) from the RAN 310.

The BMCF 340 may provide broadcast/multicast area control, broadcast/multicast admission control, or SMF selection (for example, session control via SMF selection), among other examples. The BMCF 340 may include a BMCPF that provides broadcast/multicast retransmission management. For example, the BMCPF may process NACK feedback for a broadcast/multicast communication. In some aspects, the core network 305 may not include the BMCF 340, and the functions of the BMCF 340, described above, may be performed by the AMF 320. For example, the AMF 320 may include the BMCPF.

The BMF 350 may provide broadcast/multicast session management. For example, the BMF 350 may provide management of content delivery sessions, such as file delivery over unidirectional transport (FLUTE) sessions. In some aspects, the data network 315 may be connected to the core network 305 through the BMF 350. For example, a content server, such as a FLUTE server, may be connected to the core network 305 through the BMF 350. The BMF 350 may be in communication with the SMF 325 via an interface 355. The interface 355 may be a control plane interface that enables session management or mobility management, among other examples, by the BMF 350. The BMF 350 may be in communication with the UPF 345 via an interface 360. The interface 360 may be a user plane interface that enables data transmission (for example, broadcast/multicast or unicast data transmission) by the BMF 350.

Figure 4:
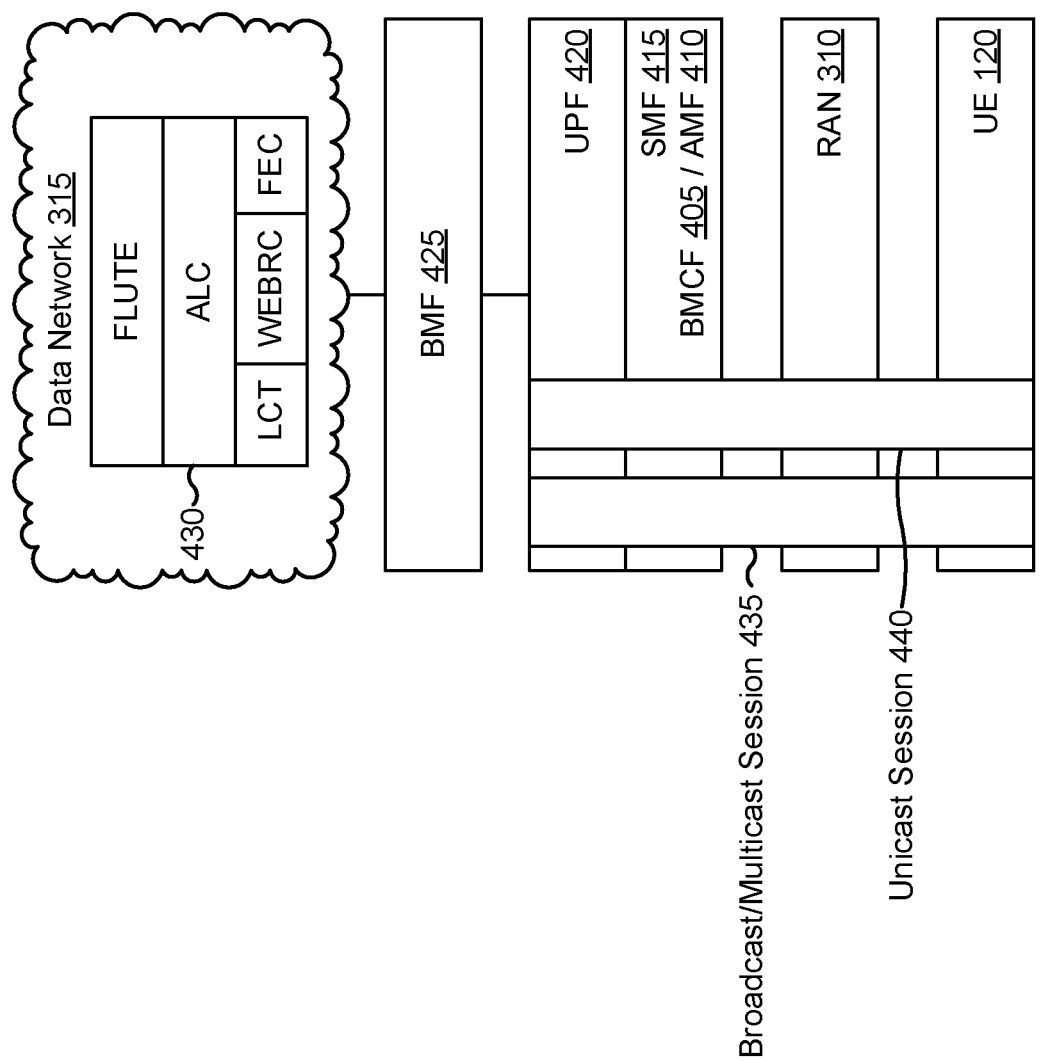
FIG. 4 is a diagram illustrating an example of mixed mode broadcast or multicast (broadcast/multicast) communication in accordance with various aspects of the present disclosure.

FIG. 4 is a diagram illustrating an example of mixed mode broadcast/multicast communication, in accordance with various aspects of the present disclosure. The example of FIG. 4 may employ the core network 305, the RAN 310, and the data network 315 described above in connection with FIG. 3. As shown in FIG. 4, a UE 120 may communicate with functions of the core network 305 via the RAN 310. The functions of the core network 305 may be implemented by one or more devices (for example, servers). For example, the UE 120 may communicate with a BMCF device 405 that implements the BMCF 340, an AMF device 410 that implements the AMF 320, an SMF device 415 that implements the SMF 325, a UPF device 420 that implements the UPF 345, and a BMF device 425 that implements the BMF 350. One or more of the BMCF device 405, the AMF device 410, the SMF device 415, the UPF device 420, or the BMF device 425 may be the same device (for example, server) or different devices.

As shown in FIG. 4, the UE 120 may communicate, via the RAN 310 and the core network 305, with the data network 315. In some aspects, the data network 315 may include a content server 430 that provides data (for example, video data) for broadcast/multicast transmissions. For example, as shown in FIG. 4, the content server 430 may be a FLUTE server that employs a FLUTE protocol on an asynchronized layer coding (ALC) protocol stack that includes a layered coding transport (LCT) protocol, a wave and equation based rate control (WEBRC) protocol, and an FEC protocol. In some aspects, the content server 430 may be another type of content server. In some aspects, the content server 430 may be a device outside of the RAN 310 or the core network 305 (for example, the content server 430 may be controlled by an entity other than an operator of the RAN 310 and the core network 305). For example, the content server 430 may be associated with a CDN or may be a multi-access edge computing device at an edge of the RAN 310.

As shown in FIG. 4, the UE 120 may establish one or more communication sessions for receiving broadcast/multicast communications or unicast communications. For example, a broadcast/multicast session 435 or a unicast session 440 may be between the UE 120 and the UPF device 420, the BMCF device 405 or the AMF device 410 (for example, the one of the BMCF device 405 or the AMF device 410 that is implementing the BMCPF), and the SMF device 415 via the RAN 310.

The UE 120 may receive, in the broadcast/multicast session 435, scheduling for a broadcast/multicast communication and the broadcast/multicast communication in accordance with the scheduling. For example, the UE 120 may receive the broadcast/multicast communication from the UPF device 420 via the RAN 310. The broadcast/multicast communication may include data originating from the content server 430. In some aspects, the broadcast/multicast communication may include one or more LCT layers (that is, channels). For example, a first layer may be a lower quality version of the broadcast/multicast communication (for example, low resolution video) and a second layer may be a higher quality version of the broadcast/multicast (for example, high resolution video). In some aspects, the broadcast/multicast communication may be encrypted according to a tunneling protocol, such as a general packet radio service (GPRS) tunneling protocol (GTP).

The UE 120 may determine that a NACK feedback message for the broadcast/multicast communication is to be transmitted. For example, the UE 120 may determine that the NACK feedback message is to be transmitted based at least in part on a determination that the broadcast/multicast communication was not received as scheduled or a determination that the broadcast/multicast communication, or a portion thereof, cannot be decoded. In some aspects, the UE 120 may determine that a NACK feedback message is to be transmitted for a particular LCT layer of the broadcast/multicast communication.

The UE 120 may transmit the NACK feedback message for the broadcast/multicast communication (or a particular LCT layer of the broadcast/multicast communication) in the broadcast/multicast session 435 based at least in part on determining that the NACK feedback message is to be transmitted. For example, the UE 120 may transmit the NACK feedback message to a BMCPF device of the core network 305 via the RAN 310. The BMCPF device may correspond to the BMCF device 405 or the AMF device 410 (that is, the one of the BMCF device 405 or the AMF device 410 implementing the BMCPF function).

The BMCPF device (for example, the BMCF device 405) may receive the NACK feedback message using the BMCPF. Based at least in part on receiving the NACK feedback message, the BMCPF device, using the BMCPF, may determine whether a retransmission of the broadcast/multicast communication to the UE 120 is to be a broadcast/multicast retransmission or a unicast retransmission. In some aspects, the BMCPF device may determine whether the retransmission is to be the broadcast/multicast retransmission or the unicast retransmission based at least in part on a quantity of NACK feedback messages that are received from a plurality of UEs (including the UE 120) within a particular time window. For example, the BMCPF device may determine that the retransmission is to be the broadcast/multicast retransmission based at least in part on a determination that the quantity of NACK feedback messages satisfies (for example, is greater than) a threshold value. Alternatively, the BMCPF device may determine that the retransmission is to be the unicast retransmission based at least in part on a determination that the quantity of NACK feedback messages does not satisfy (for example, is less than) the threshold value. The retransmission may be a repetition of the broadcast/multicast communication or may be the broadcast/multicast communication with added redundancy (for example, using FEC).

The BMCPF device, using the BMCPF, may cause the retransmission of the broadcast/multicast communication to be transmitted to the UE 120 via the RAN 310. For example, the BMCPF device may cause the UPF device 420 to transmit, via the RAN 310, the retransmission of the broadcast/multicast communication. The retransmission may originate from the content server 430. For example, the BMCPF device may cause the BMF device 425 to obtain (for example, via a request) the retransmission from the content server 430, and provide the retransmission to the UPF device 420 for transmission via the RAN 310. In other words, the content server 430 may transmit the retransmission via the BMF device 425.

In some aspects, the BMCPF device may cause the broadcast/multicast retransmission to be transmitted in the broadcast/multicast session 435. In some other aspects, the BMCPF device may cause the unicast retransmission to be transmitted in the unicast session 440. In some aspects, the retransmission may be encrypted according to a tunneling protocol, as described above.

The UE 120 may receive the retransmission of the broadcast/multicast communication via the RAN 310. For example, the UE 120 may receive the retransmission of the broadcast/multicast communication based at least in part in transmitting the NACK feedback message. In this way, performance of the broadcast/multicast communication may be improved with greater efficiency.

In some aspects, the BMF device 425 may control one or more of the retransmission operations discussed above rather than the BMCPF device. For example, the BMF device 425 may determine whether a retransmission is to be a broadcast/multicast retransmission or a unicast retransmission or may cause the UPF device 420 to transmit the retransmission. In some aspects, the content server 430 may receive the NACK feedback message from the UE 120 (for example, to determine whether a retransmission is to be a broadcast/multicast retransmission or a unicast retransmission). Based at least in part on receiving the NACK feedback message, the content server 430 may transmit the retransmission of the broadcast/multicast communication via the BMF device 425. In this way, the core network 305 may function as a data pipe for the content server 430.

Figure 5:
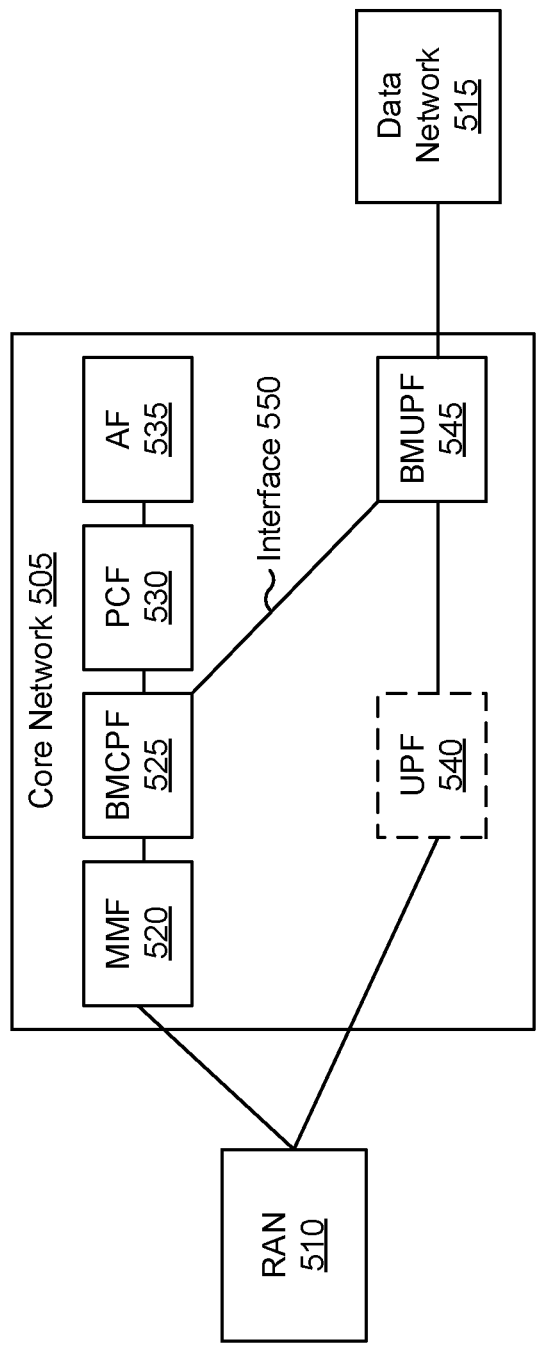
FIG. 5 is a diagram illustrating an example functional architecture of a core network in accordance with various aspects of the present disclosure.

FIG. 5 is a diagram illustrating an example functional architecture of a core network 505, in accordance with various aspects of the present disclosure. In some aspects, the core network 505 may have an architecture that separates control plane and user plane functionality. As shown in FIG. 5, the core network 505 may be in communication with a RAN 510 and a data network 515, as described above in connection with FIG. 3.

The core network 505 may include various types of core network architectures, such as a 5G NG Core included in a 5G wireless telecommunications system. In some aspects, the core network 505 may be implemented on physical devices or may be virtualized, as described above in connection with FIG. 3. In some aspects, on or more devices implementing the core network 505 may be co-located with a base station (for example, BS 110).

As shown in FIG. 5, the core network 505 may include multiple functional elements. One or more of the functional elements of the core network 505 may be implemented on one or more devices (for example, servers). The functional elements of the core network 505 may include a mobility management function (MMF) 520, a BMCPF 525, a PCF 530, an AF 535, a UPF 540, and a broadcast/multicast user plane function (BMUPF) 545. As shown in FIG. 5, the RAN 510 may be connected to the core network 505 through the MMF 520, the UPF 540, or the BMUPF 545.

The PCF 530, the AF 535, and the UPF 540 may correspond to the PCF 330, the AF 335, and the UPF 345, respectively, as described above in connection with FIG. 3. The MMF 520 may provide mobility management and control plane termination at the RAN 510.

The BMCPF 525 may implement a broadcast/multicast control plane. For example, the BMCPF 525 may provide broadcast/multicast retransmission management. As an example, the BMCPF 525 may process NACK feedback for a broadcast/multicast communication. In addition, the BMCPF 525 may perform broadcast/multicast security functions, provide broadcast/multicast service announcements, and perform broadcast/multicast session control.

The BMUPF 545 may implement a broadcast/multicast user plane that is controlled by the BMCPF 525 (that is, the broadcast/multicast control plane). The BMUPF 545 may be in communication with the BMCPF 525 via an interface 550. The interface 550 may be a control plane interface that enables session management (for example, FLUTE session management), among other examples, by the BMUPF 545. In some aspects, the data network 515 may be connected to the core network 505 through the BMUPF 545, as described above in connection with FIG. 3. In some aspects, the BMUPF 545 may have a connection to the RAN 510 that bypasses the UPF 540 (indicated by a broken line in FIG. 5).

Figure 6:
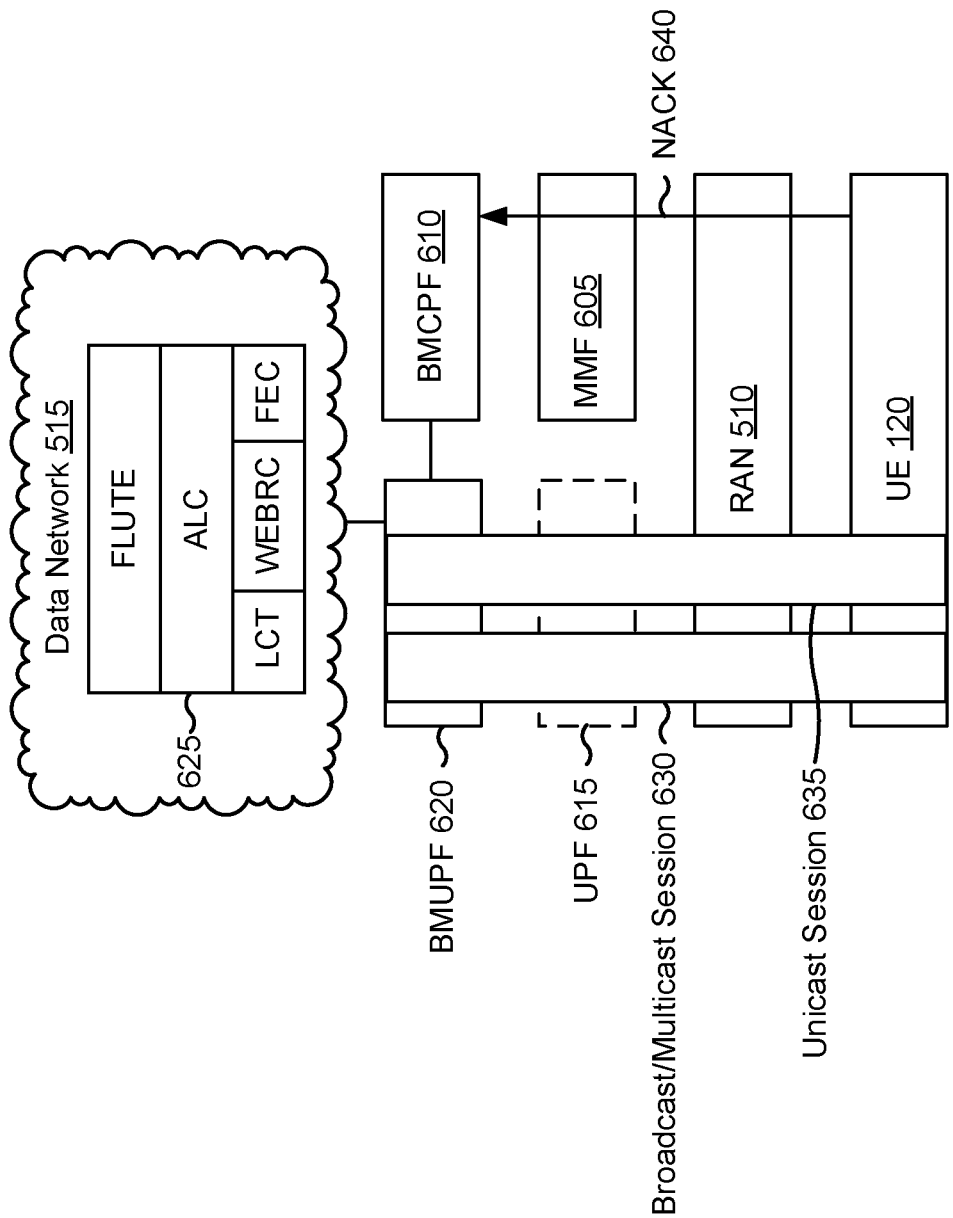
FIG. 6 is a diagram illustrating an example of mixed mode broadcast/multicast communication in accordance with various aspects of the present disclosure.

FIG. 6 is a diagram illustrating an example of mixed mode broadcast/multicast communication, in accordance with various aspects of the present disclosure. The example of FIG. 6 may employ the core network 505, the RAN 510, and the data network 515 described above in connection with FIG. 5. As shown in FIG. 6, a UE 120 may communicate with functions of the core network 505 via the RAN 510. The functions of the core network 505 may be implemented by one or more devices (for example, servers). For example, the UE 120 may communicate with an MMF device 605 that implements the MMF 520, a BMCPF device 610 that implements the BMCPF 525, a UPF device 615 that implements the UPF 540, and a BMUPF device 620 that implements the BMUPF 545. One or more of the MMF device 605, the BMCPF device 610, the UPF device 615, or the BMUPF device 620 may be the same device (for example, server) or different devices.

As shown in FIG. 6, the UE 120 may communicate, via the RAN 510 and the core network 505, with the data network 515. In some aspects, the data network 515 may include a content server 625 that may correspond to the content server 430, as described above in connection with FIG. 4.

As shown in FIG. 6, the UE 120 may establish one or more communication sessions for receiving broadcast/multicast communications or unicast communications. For example, a broadcast/multicast session 630 or a unicast session 635 may be between the UE 120 and the BMUPF device 620 via the RAN 510. In other words, the broadcast/multicast session 630 or the unicast session 635 may bypass the UPF device 615 (indicated by a broken line in FIG. 6).

The UE 120 may receive, in the broadcast/multicast session 435, scheduling for a broadcast/multicast communication and the broadcast/multicast communication in accordance with the scheduling. For example, the UE 120 may receive the broadcast/multicast communication from the BMUPF device 620 via the RAN 510. The broadcast/multicast communication may include data originating from the content server 625. In some aspects, the broadcast/multicast communication may include one or more LCT layers, or may be encrypted according to a tunneling protocol, as described above in connection with FIG. 4.

The UE 120 may determine that a NACK feedback message 640 for the broadcast/multicast communication is to be transmitted, as described above in connection with FIG. 4. The UE 120 may transmit the NACK feedback message 640 for the broadcast/multicast communication (or a particular LCT layer of the broadcast/multicast communication) based at least in part on determining that the NACK feedback message 640 is to be transmitted. For example, the UE 120 may transmit the NACK feedback message 640 to the BMCPF device 610 via the RAN 510 (and via the MMF device 605).

The BMCPF device 610 may receive the NACK feedback message 640 using the BMCPF. Based at least in part on receiving the NACK feedback message 640, the BMCPF device 610, using the BMCPF, may determine whether a retransmission of the broadcast/multicast communication to the UE 120 is to be a broadcast/multicast retransmission or a unicast retransmission, as described above in connection with FIG. 4.

The BMCPF device 610, using the BMCPF, may cause the retransmission of the broadcast/multicast communication to be transmitted to the UE 120 via the RAN 510. For example, the BMCPF device 610 may cause the BMUPF device 620 or the UPF device 615 to transmit, via the RAN 510, the retransmission of the broadcast/multicast communication. The retransmission may originate from the content server 625. For example, the BMCPF device 610 may cause the BMUPF device 620 to obtain (for example, via a request) the retransmission from the content server 625 for transmission via the RAN 310. In other words, the content server 625 may transmit the retransmission via the BMUPF device 620.

In some aspects, the BMCPF device 610 may cause the broadcast/multicast retransmission to be transmitted by the BMUPF device 620 in the broadcast/multicast session 630. In some other aspects, the BMCPF device 610 may cause the unicast retransmission to be transmitted by the BMUPF device 620 in the unicast session 635. In some further aspects, the BMCPF device 610 may cause the unicast retransmission to be transmitted by the UPF device 615 in a unicast session between the UE 120 and the UPF device 615. In some aspects, the retransmission may be encrypted according to a tunneling protocol, as described above.

The UE 120 may receive the retransmission of the broadcast/multicast communication via the RAN 510. For example, the UE 120 may receive the retransmission of the broadcast/multicast communication based at least in part in transmitting the NACK feedback message 640. In this way, performance of the broadcast/multicast communication may be improved with greater efficiency.

In some aspects, the BMUPF device 620 may control one or more of the retransmission operations discussed above rather than the BMCPF device 610, as described above in connection with FIG. 4. In some aspects, the content server 625 may receive the NACK feedback message 640 from the UE 120, as described above in connection with FIG. 4.

Figure 7:
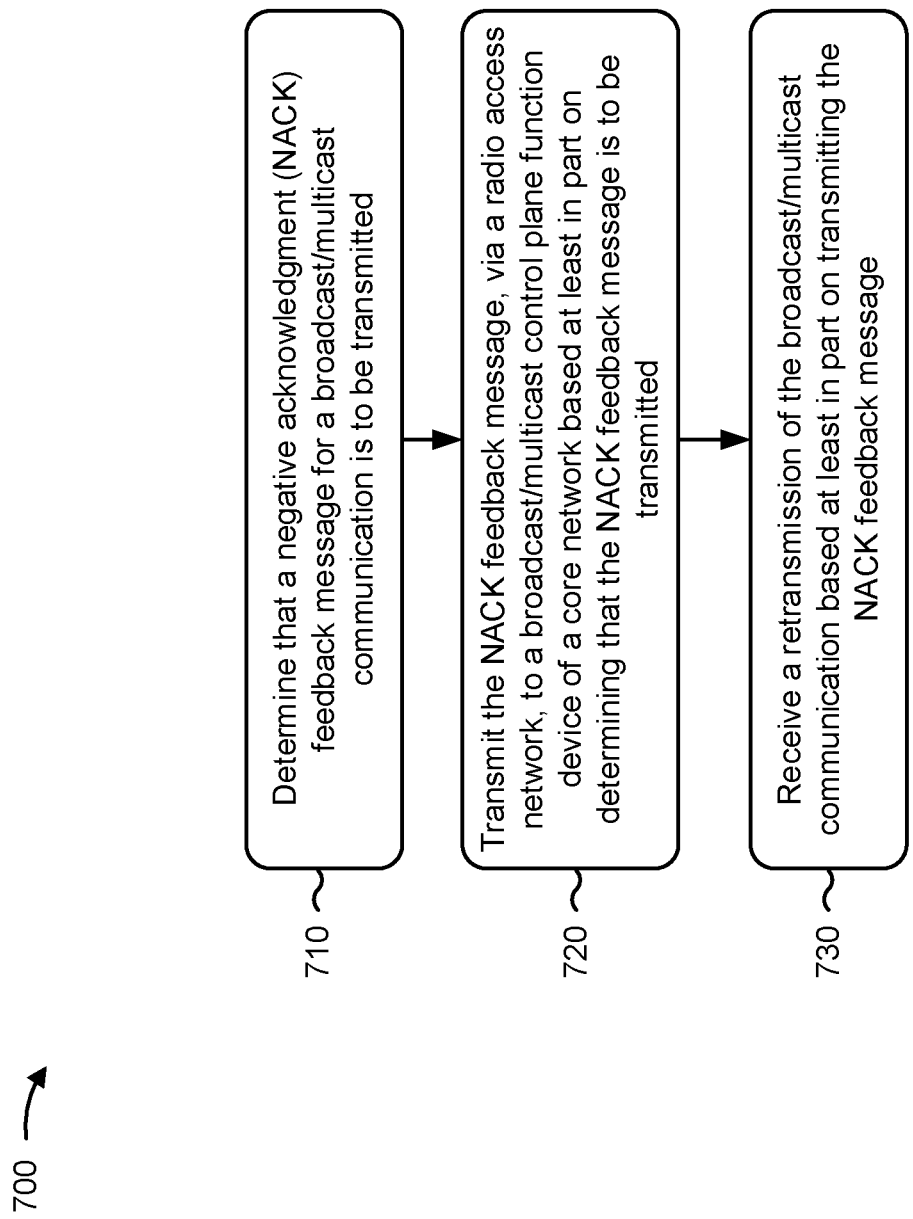
FIG. 7 is a flowchart illustrating an example process of mixed mode broadcast/multicast communication performed by a UE in accordance with various aspects of the present disclosure.

FIG. 7 is a diagram illustrating an example process 700 of mixed mode broadcast/multicast communication performed, for example, by a UE, in accordance with various aspects of the present disclosure. Example process 700 is an example where the UE, such as UE 120, performs operations associated with mixed mode broadcast/multicast communication.

As shown in FIG. 7, in some aspects, process 700 may include determining that a NACK feedback message for a broadcast/multicast communication is to be transmitted (block 710). For example, the UE (using controller/processor 280, among other examples) may determine that a NACK feedback message for a broadcast/multicast communication is to be transmitted, as described above.

As further shown in FIG. 7, in some aspects, process 700 may include transmitting the NACK feedback message, via a RAN, to a BMCPF device of a core network based at least in part on determining that the NACK feedback message is to be transmitted (block 720). For example, the UE (using controller/processor 280, transmit processor 264, TX MIMO processor 266, MOD 254, antenna 252, among other examples) may transmit the NACK feedback message, via a RAN, to a BMCPF device of a core network based at least in part on determining that the NACK feedback message is to be transmitted, as described above.

As further shown in FIG. 7, in some aspects, process 700 may include receiving a retransmission of the broadcast/multicast communication based at least in part on transmitting the NACK feedback message (block 730). For example, the UE (using antenna 252, DEMOD 254, MIMO detector 256, receive processor 258, controller/processor 280, among other examples) may receive a retransmission of the broadcast/multicast communication based at least in part on transmitting the NACK feedback message, as described above.

Process 700 may include additional aspects, such as any single aspect or any combination of aspects described below or in connection with one or more other processes described elsewhere herein.

In a first aspect, the retransmission is a broadcast/multicast retransmission based at least in part on a quantity of NACK feedback messages for the broadcast/multicast communication, transmitted by a plurality of UEs that includes the UE, satisfying a threshold value. In a second additional aspect, alone or in combination with the first aspect, the retransmission is a unicast retransmission based at least in part on a quantity of NACK feedback messages for the broadcast/multicast communication, transmitted by a plurality of UEs that includes the UE, not satisfying a threshold value.

In a third additional aspect, alone or in combination with one or more of the first and second aspects, the retransmission is received, via the RAN, from a UPF device of the core network. In a fourth additional aspect, alone or in combination with one or more of the first through third aspects, the UPF device is in communication, via a user plane interface, with a BMF device of the core network, and the BMF device is in communication, via a control plane interface, with an SMF device of the core network and in communication with a content server outside of the core network. In a fifth additional aspect, alone or in combination with one or more of the first through fourth aspects, the BMCPF device is a BMCF device or an AMF device of the core network.

In a sixth additional aspect, alone or in combination with one or more of the first through fifth aspects, the retransmission is received, via the RAN, from a BMUPF device of the core network. In a seventh additional aspect, alone or in combination with one or more of the first through sixth aspects, the BMUPF device is in communication, via a control plane interface, with the BMCPF device and in communication with a content server outside of the core network. In an eighth additional aspect, alone or in combination with one or more of the first through seventh aspects, the BMCPF device is in communication with an MMF device that provides control plane termination at the RAN.

In a ninth additional aspect, alone or in combination with one or more of the first through eighth aspects, the retransmission is from a content server outside of the core network. In a tenth additional aspect, alone or in combination with one or more of the first through ninth aspects, the broadcast/multicast communication is encrypted according to a tunneling protocol. In an eleventh additional aspect, alone or in combination with one or more of the first through tenth aspects, the broadcast/multicast communication includes one or more LCT layers, and the NACK feedback message relates to a particular layer of the LCT layers.

Figure 8:
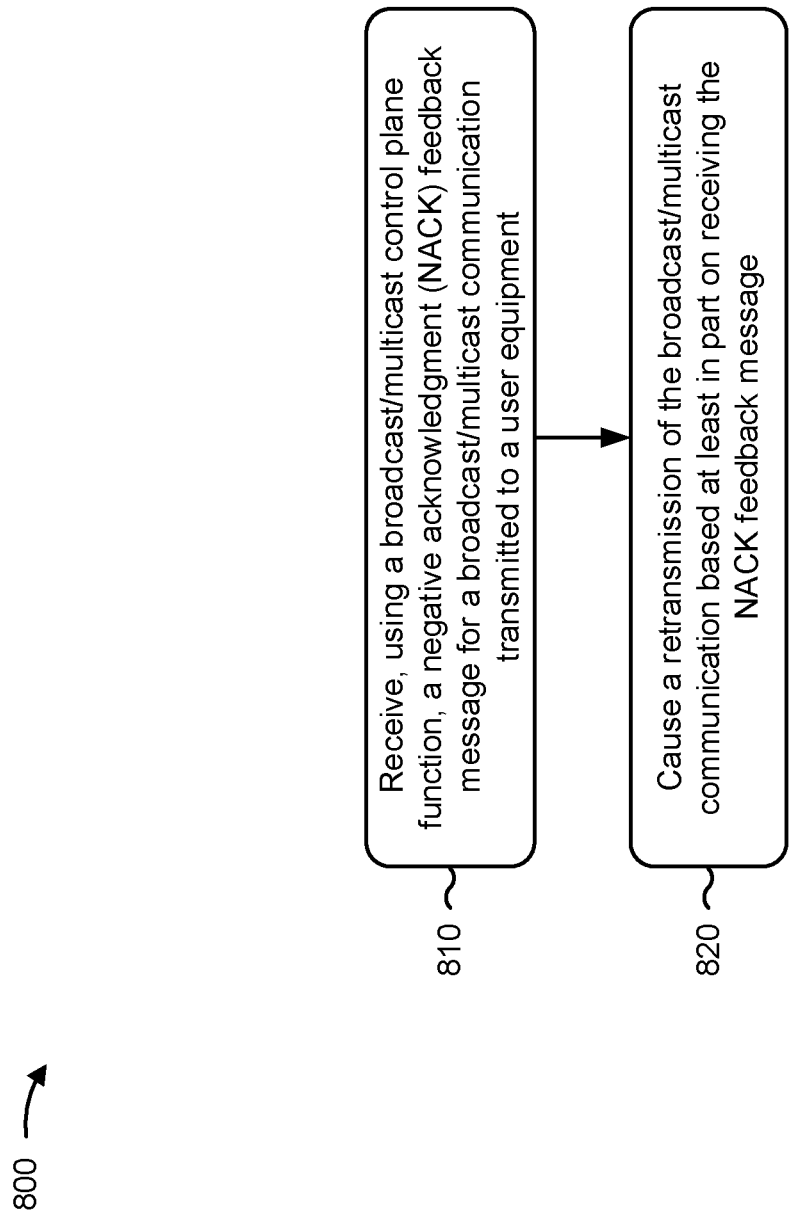
FIG. 8 is a flowchart illustrating an example process of mixed mode broadcast/multicast communication performed by a device of a core network in accordance with various aspects of the present disclosure.

FIG. 8 is a diagram illustrating an example process 800 of mixed mode broadcast/multicast communication performed, for example, by a device of a core network, in accordance with various aspects of the present disclosure. Example process 800 is an example where the device, such as a BS 110, BMCF device 405, AMF device 410, or BMCPF device 610 performs operations associated with mixed mode broadcast/multicast communication.

As shown in FIG. 8, in some aspects, process 800 may include receiving, using a BMCPF, a NACK feedback message for a broadcast/multicast communication transmitted to a UE (block 810). For example, the device (using antenna 234, DEMOD 232, MIMO detector 236, receive processor 238, controller/processor 240, among other examples) may receive, using a BMCPF, a NACK feedback message for a broadcast/multicast communication transmitted to a UE, as described above.

As further shown in FIG. 8, in some aspects, process 800 may include causing a retransmission of the broadcast/multicast communication based at least in part on receiving the NACK feedback message (block 820). For example, the device (using controller/processor 240, transmit processor 220, TX MIMO processor 230, MOD 232, antenna 234, among other examples) may cause a retransmission of the broadcast/multicast communication based at least in part on receiving the NACK feedback message, as described above.

Process 800 may include additional aspects, such as any single aspect or any combination of aspects described below or in connection with one or more other processes described elsewhere herein.

In a first aspect, the retransmission is a broadcast/multicast retransmission based at least in part on a determination that a quantity of NACK feedback messages received for the broadcast/multicast communication, from a plurality of UEs that includes the UE, satisfies a threshold value. In a second additional aspect, alone or in combination with the first aspect, the retransmission is a unicast retransmission based at least in part on a determination that a quantity of NACK feedback messages received for the broadcast/multicast communication, from a plurality of UEs that includes the UE, does not satisfy a threshold value.

In a third additional aspect, alone or in combination with one or more of the first and second aspects, causing the retransmission causes a UPF device of the core network to transmit the retransmission. In a fourth additional aspect, alone or in combination with one or more of the first through third aspects, the UPF device is in communication, via a user plane interface, with a BMF device of the core network, and the BMF device is in communication, via a control plane interface, with an SMF device of the core network and in communication with a content server outside of the core network. In a fifth additional aspect, alone or in combination with one or more of the first through fourth aspects, the device is a BMCF device or an AMF device of the core network.

In a sixth additional aspect, alone or in combination with one or more of the first through fifth aspects, causing the retransmission causes a BMUPF device of the core network to transmit the retransmission. In a seventh additional aspect, alone or in combination with one or more of the first through sixth aspects, the BMUPF device is in communication, via a control plane interface, with the BMCPF of the device and in communication with a content server outside of the core network. In an eighth additional aspect, alone or in combination with one or more of the first through seventh aspects, the BMCPF of the device is in communication with an MMF device that provides control plane termination at a RAN.

In a ninth additional aspect, alone or in combination with one or more of the first through eighth aspects, the retransmission is from a content server outside of the core network. In a tenth additional aspect, alone or in combination with one or more of the first through ninth aspects, the broadcast/multicast communication is encrypted according to a tunneling protocol. In an eleventh additional aspect, alone or in combination with one or more of the first through tenth aspects, the broadcast/multicast communication includes one or more LCT layers, and the NACK feedback message relates to a particular layer of the LCT layers.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a negative acknowledgment (NACK) feedback message for a broadcast/multicast communication, via a radio access network (RAN), to a broadcast/multicast control plane function device of a core network that provides broadcast/multicast retransmission management for the core network, performs broadcast/multicast security functions for the core network, provides broadcast/multicast service announcements for the core network, performs broadcast/multicast session control for the core network, or a combination thereof; and receiving a unicast retransmission of the broadcast/multicast communication based at least in part on transmitting the NACK feedback message.

2. The method of claim 1, wherein the unicast retransmission is based at least in part on a quantity of NACK feedback messages for the broadcast/multicast communication, transmitted by a plurality of UEs that includes the UE, not satisfying a threshold value.

3. The method of claim 1, wherein the unicast retransmission is received, via the RAN, from a user plane function (UPF) device of the core network.

4. The method of claim 3, wherein the UPF device is in communication, via a user plane interface, with a broadcast/multicast function device of the core network, and wherein the broadcast/multicast function device is in communication, via a control plane interface, with a session management function device of the core network and in communication with a content server outside of the core network.

5. The method of claim 1, wherein the broadcast/multicast control plane function device is a broadcast/multicast coordination function device or an access and mobility management function device of the core network.

6. The method of claim 1, wherein the unicast retransmission is received, via the RAN, from a broadcast/multicast user plane function device of the core network.

7. The method of claim 6, wherein the broadcast/multicast user plane function device is in communication, via a control plane interface, with the broadcast/multicast control plane function device and in communication with a content server outside of the core network.

8. The method of claim 1, wherein the broadcast/multicast control plane function device is in communication with a mobility management function device that provides control plane termination at the RAN.

9. The method of claim 1, wherein the unicast retransmission is from a content server outside of the core network.

10. The method of claim 1, wherein the broadcast/multicast communication is encrypted according to a tunneling protocol.

11. The method of claim 1, wherein the broadcast/multicast communication includes one or more layer coding transport (LCT) layers, and the NACK feedback message relates to a particular layer of the LCT layers.

12. A method of wireless communication performed by a device of a core network, comprising:

receiving, using a broadcast/multicast control plane function, a negative acknowledgment (NACK) feedback message for a broadcast/multicast communication transmitted to a user equipment (UE), wherein the broadcast/multicast control plane function provides broadcast/multicast retransmission management for the core network, performs broadcast/multicast security functions for the core network, provides broadcast/multicast service announcements for the core network, performs broadcast/multicast session control for the core network, or a combination thereof; and causing a unicast retransmission of the broadcast/multicast communication based at least in part on receiving the NACK feedback message.

13. The method of claim 12, wherein the unicast retransmission is based at least in part on a determination that a quantity of NACK feedback messages received for the broadcast/multicast communication, from a plurality of UEs that includes the UE, does not satisfy a threshold value.

14. The method of claim 12, wherein causing the unicast retransmission causes a user plane function (UPF) device of the core network to transmit the unicast retransmission.

15. The method of claim 14, wherein the UPF device is in communication, via a user plane interface, with a broadcast/multicast function device of the core network, and wherein the broadcast/multicast function device is in communication, via a control plane interface, with a session management function device of the core network and in communication with a content server outside of the core network.

16. The method of claim 12, wherein the device is a broadcast/multicast coordination function device or an access and mobility management function device of the core network.

17. The method of claim 12, wherein causing the unicast retransmission causes a broadcast/multicast user plane function device of the core network to transmit the unicast retransmission.

18. The method of claim 17, wherein the broadcast/multicast user plane function device is in communication, via a control plane interface, with the broadcast/multicast control plane function of the device and in communication with a content server outside of the core network.

19. The method of claim 12, wherein the broadcast/multicast control plane function of the device is in communication with a mobility management function device that provides control plane termination at a radio access network.

20. The method of claim 12, wherein the unicast retransmission is from a content server outside of the core network.

21. The method of claim 12, wherein the broadcast/multicast communication is encrypted according to a tunneling protocol.

22. The method of claim 12, wherein the broadcast/multicast communication includes one or more layer coding transport (LCT) layers, and the NACK feedback message relates to a particular layer of the LCT layers.

23. A user equipment (UE) for wireless communication, comprising:

at least one memory; and at least one processor communicatively coupled with the at least one memory, the at least one processor configured to cause the UE to:

transmit a negative acknowledgment (NACK) feedback message for a broadcast/multicast communication, via a radio access network (RAN), to a broadcast/multicast control plane function device of a core network that provides broadcast/multicast retransmission management for the core network, performs broadcast/multicast security functions for the core network, provides broadcast/multicast service announcements for the core network, performs broadcast/multicast session control for the core network, or a combination thereof; and receive a unicast retransmission of the broadcast/multicast communication based at least in part on transmitting the NACK feedback message.

24. The UE of claim 23, wherein the unicast retransmission is based at least in part on a quantity of NACK feedback messages for the broadcast/multicast communication, transmitted by a plurality of UEs that includes the UE, not satisfying a threshold value.

25. The UE of claim 23, wherein the broadcast/multicast control plane function device is a broadcast/multicast coordination function device or an access and mobility management function device of the core network.

26. The UE of claim 23, wherein the at least one processor, to cause the UE to receive the unicast retransmission, is configured to cause the UE to receive the unicast retransmission, via the RAN, from a broadcast/multicast user plane function device of the core network.

27. A device of a core network for wireless communication, comprising:
   at least one memory; and
   at least one processor communicatively coupled with the at least one memory, the at least one processor configured to cause the device to:
      receive, using a broadcast/multicast control plane function, a negative acknowledgment (NACK) feedback message for a broadcast/multicast communication transmitted to a user equipment (UE), wherein the broadcast/multicast control plane function provides broadcast/multicast retransmission management for the core network, performs broadcast/multicast security functions for the core network, provides broadcast/multicast service announcements for the core network, performs broadcast/multicast session control for the core network, or a combination thereof; and
      cause a unicast retransmission of the broadcast/multicast communication based at least in part on receiving the NACK feedback message.

28. The device of claim 27, wherein the unicast retransmission is based at least in part on a determination that a quantity of NACK feedback messages received for the broadcast/multicast communication, from a plurality of UEs that includes the UE, does not satisfy a threshold value.

29. The device of claim 27, wherein the device is a broadcast/multicast coordination function device or an access and mobility management function device of the core network.

30. The device of claim 27, wherein the at least one processor, to cause the device to cause the unicast retransmission, is configured to cause the device to cause a broadcast/multicast user plane function device of the core network to transmit the unicast retransmission.

\* \* \* \* \*